(12) United States Patent
Chrien et al.

(10) Patent No.: US 12,020,402 B2
(45) Date of Patent: Jun. 25, 2024

(54) DIRECT SUN IMAGING STAR TRACKER

(71) Applicant: The Boeing Company, Chicago, IL (US)

(72) Inventors: Thomas George Chrien, Rancho Palos Verdes, CA (US); Thomas Daniel Salzman, Santa Monica, CA (US)

(73) Assignee: THE BOEING COMPANY, Chicago, IL (US)

( * ) Notice: Subject to any disclaimer, the term of this patent is extended or adjusted under 35 U.S.C. 154(b) by 216 days.

(21) Appl. No.: 17/355,846

(22) Filed: Jun. 23, 2021

(65) Prior Publication Data
US 2021/0407059 A1    Dec. 30, 2021

Related U.S. Application Data

(60) Provisional application No. 63/044,848, filed on Jun. 26, 2020.

(51) Int. Cl.
*G06T 5/50* (2006.01)
*B64G 1/36* (2006.01)
*G01C 21/02* (2006.01)
*G01S 3/786* (2006.01)

(52) U.S. Cl.
CPC ............... *G06T 5/50* (2013.01); *B64G 1/361* (2013.01); *B64G 1/363* (2013.01); *G01C 21/025* (2013.01); *G01S 3/7862* (2013.01); *G01S 3/7867* (2013.01); *G06T 2207/10032* (2013.01)

(58) Field of Classification Search
CPC ............. G06T 5/50; G06T 2207/10032; G06T 2207/20221; B64G 1/361; B64G 1/363; G01C 21/025; G01S 3/7862; G01S 3/7867
See application file for complete search history.

(56) References Cited

U.S. PATENT DOCUMENTS

| | | | | |
|---|---|---|---|---|
| 11,044,397 | B2* | 6/2021 | Hisamoto | H04N 23/698 |
| 2003/0006345 | A1* | 1/2003 | Guo | B64G 1/361 |
| | | | | 244/168 |
| 2009/0284644 | A1* | 11/2009 | McKaughan | H04N 23/90 |
| | | | | 348/E5.045 |
| 2011/0051149 | A1 | 3/2011 | McComas et al. | |
| 2021/0108922 | A1 | 4/2021 | Dawson et al. | |

FOREIGN PATENT DOCUMENTS

| | | |
|---|---|---|
| DE | 3412046 A1 | 10/1985 |
| DE | 19846690 A1 | 4/2000 |
| WO | 0149565 A1 | 7/2001 |

OTHER PUBLICATIONS

European Application Serial No. 21188846.6, Search Report dated Jan. 5, 2022, 8 pgs.

* cited by examiner

*Primary Examiner* — Mekonen T Bekele
(74) *Attorney, Agent, or Firm* — Kwan & Olynick LLP

(57) ABSTRACT

Described are systems and methods for direct sun imaging by a star tracker. Disclosed in a certain example is a direct sun imaging star tracker that includes an imaging sensor and a baffle. The baffle includes a star port, a sun port, and a beam splitter. The star port is configured to image first viewing environment while the sun port is configured to image a second viewing environment that includes the sun. The beam splitter is configured to combine electromagnetic radiation from the star port and the sun port into a combined image. In various examples, the systems and techniques described herein allow a star tracker to simultaneously view both the sun and the stars.

20 Claims, 16 Drawing Sheets

DIRECT SUN IMAGING STAR TRACKER

CROSS-REFERENCE TO RELATED APPLICATIONS

This application claims the benefit under 35 U.S.C. § 119(e) of U.S. Provisional Patent Application 63/044,848, filed on 2020 Jun. 26 and entitled "Direct Sun Imaging Star Tracker," which is incorporated herein by reference in its entirety for all purposes.

BACKGROUND

Conventional star trackers are not configured to view the sun. Viewing the sun with a conventional star tracker washes out the view of the star tracker and leads to no useful data. Conventional star trackers are sometimes fitted with a filter wheel that allows the star tracker to view the sun in certain configurations. However, such a configuration requires a mechanism to move the filter wheel, increasing complication and weight, and the filter prevents viewing of stars, preventing simultaneous viewing of both the sun and the stars.

SUMMARY

Described are methods and systems for a direct sun imaging star tracker. In a certain example, a spacecraft is disclosed that includes a spacecraft structure and a star tracker, coupled to the spacecraft structure. The spacecraft structure includes an imaging sensor, configured to receive electromagnetic radiation via a combined viewpath, and a baffle, disposed proximate the imaging sensor. The baffle includes a star port, configured to receive first electromagnetic radiation associated with a first viewing environment via a first path, a sun port, configured to receive second electromagnetic radiation associated with a second viewing environment via a second path and configured to attenuate a magnitude of the second electromagnetic radiation, and a beam splitter, configured to receive the first electromagnetic radiation of the first path and the second electromagnetic radiation of the second path and configured to combine the first electromagnetic radiation and the second electromagnetic radiation into the combined viewpath.

In another example, a star tracker is disclosed. The star tracker includes an imaging sensor, configured to receive electromagnetic radiation via a combined viewpath, and a baffle, disposed proximate the imaging sensor. The baffle includes a star port, configured to receive first electromagnetic radiation associated with a first viewing environment via a first path, a sun port, configured to receive second electromagnetic radiation associated with a second viewing environment via a second path and configured to attenuate a magnitude of the second electromagnetic radiation, and a beam splitter, configured to receive the first electromagnetic radiation of the first path and the second electromagnetic radiation of the second path and configured to combine the first electromagnetic radiation and the second electromagnetic radiation into the combined viewpath.

In a further example, a method is disclosed. The method includes positioning a star tracker such that a second viewing environment containing a sun is within view of a sun port of the star tracker and a first viewing environment different from the second viewing environment is within view of a star port of the star tracker, wherein the sun port is configured to attenuate a magnitude of the view of the second viewing environment and imaging the first viewing environment and the second viewing environment with an imaging sensor of the star tracker.

Illustrative, non-exclusive examples of inventive features according to present disclosure are described herein. These and other examples are described further below with reference to figures.

BRIEF DESCRIPTION OF THE DRAWINGS

The disclosure may best be understood by reference to the following description taken in conjunction with the accompanying drawings, which illustrate various examples.

DETAILED DESCRIPTION

In the following description, numerous specific details are set forth in order to provide a thorough understanding of the presented concepts. The presented concepts may be practiced without some, or all, of these specific details. In other instances, well known process operations have not been described in detail to avoid unnecessarily obscuring the described concepts. While some concepts will be described with the specific examples, it will be understood that these examples are not intended to be limiting.

Introduction

Described herein is a direct sun imaging star tracker and techniques for operation thereof. In certain examples, a direct sun imaging star tracker is disclosed. The star tracker includes an imaging sensor, configured to receive electromagnetic radiation via a combined viewpath, and a baffle. The baffle is disposed proximate the imaging sensor and includes a star port, a sun port, and a beam splitter. The star port is configured to receive first electromagnetic radiation associated with a first viewing environment via a first path. The sun port is configured to receive second electromagnetic radiation associated with a second viewing environment via a second path and configured to attenuate a magnitude of the second electromagnetic radiation. The beam splitter is configured to receive the first electromagnetic radiation of the first path and the second electromagnetic radiation of the second path and is configured to combine the first electromagnetic radiation and the second electromagnetic radiation into the combined viewpath. The star tracker, in certain examples, is coupled to a spacecraft structure.

In various examples, the systems and techniques described herein allow a star tracker to simultaneously view both the sun and the stars. Such systems and techniques allow for the star tracker to utilize the stars for navigational and other purposes while continuing to observe the sun at the same time. In certain examples, the star tracker is a portion of a spacecraft, but other examples include the star tracker as a portion of other vehicles or structures, such as terrestrial observatories, aircraft, ships, and others.

Spacecraft Example

Figure 1:
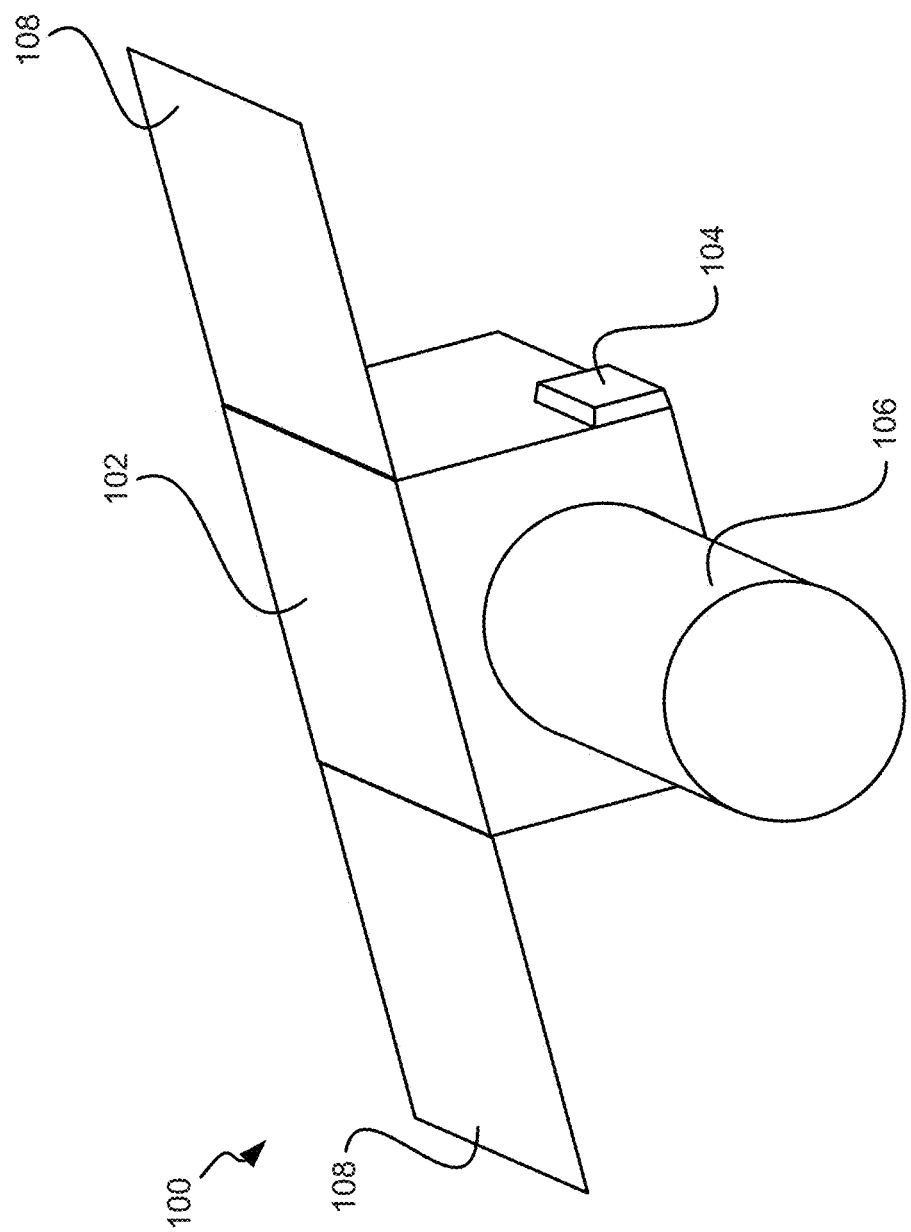
FIG. 1 illustrates a satellite vehicle, in accordance with some examples.

FIG. 1 illustrates a satellite vehicle, in accordance with some examples. FIG. 1 illustrates spacecraft 100 that includes spacecraft structure 102. In various examples, spacecraft structure 102 is the main structure of spacecraft 100. Thus, various systems of spacecraft 100 is disposed within or otherwise coupled to (e.g., directly or indirectly connected to) spacecraft structure 102. Spacecraft structure 102 is constructed from any metallic, composite, or other material appropriate for spacecraft construction. Spacecraft structure 102 may include one or more propulsion systems, electrical systems, navigation systems, instruments, power management systems, logic systems, and other such systems.

For example, spacecraft structure 102 includes star tracker 104, spacecraft instrument 106, and power system 108. Spacecraft instrument 106, in certain examples, is an instrument for use in operation of spacecraft 100. Thus, for example, spacecraft instrument 106 is an observation instrument (e.g., a telescope), a data instrument (e.g., a global positioning system), and/or another such instrument. Power system 108, in certain examples, is a solar panel, batteries, fuel tanks, and/or other such system configured to generate and/or store power for spacecraft 100.

In certain examples, star tracker 104 is configured to determine the position of one or more stars relative to spacecraft 100. Star tracker 104 allows for the position of the stars relative to spacecraft 100 to be determined to, for example, allow for navigation of spacecraft 100. In certain examples described herein, star tracker 104 includes a baffle that allows for star tracker 104 to simultaneously image the stars as well as the sun.

Figure 2:
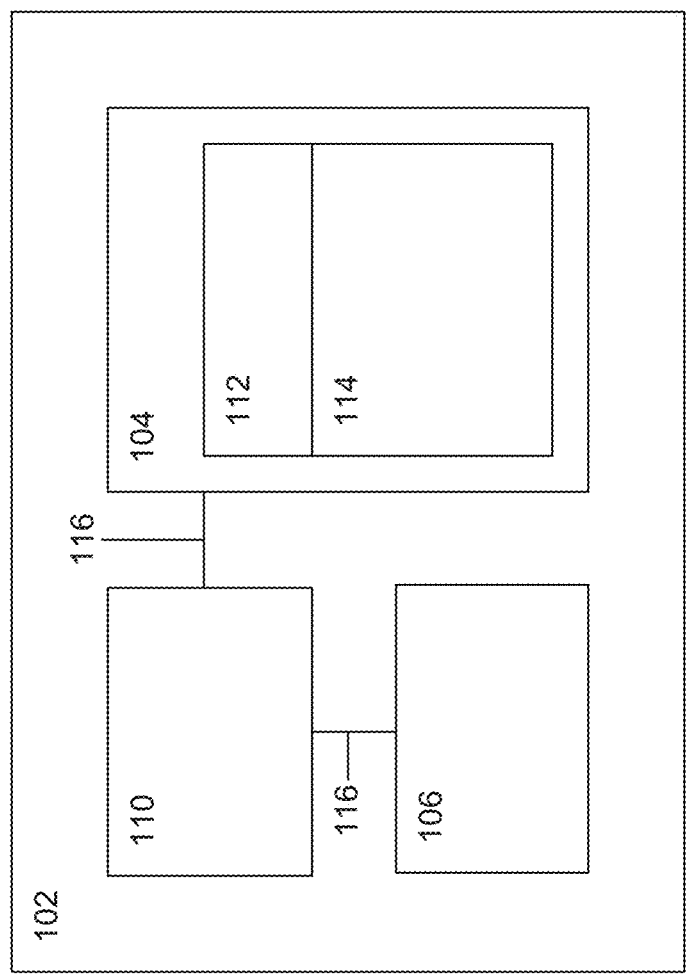
FIG. 2 illustrates a block diagram of a satellite vehicle, in accordance with some examples.

FIG. 2 illustrates a block diagram of a satellite vehicle, in accordance with some examples. FIG. 2 illustrates a block diagram of spacecraft structure 102. Star tracker 104 and spacecraft instrument 106 are coupled to and/or disposed within spacecraft structure 102. Spacecraft instrument 106, in certain examples, is as described herein and is used to perform operations for spacecraft 100.

Star tracker 104 is configured to track stars (e.g., for navigation of spacecraft 100). In certain examples, star tracker 104 is configured to also image the sun while imaging the stars. Star tracker 104 includes imaging sensor 112 and baffle 114. Imaging sensor 112 is configured to receive electromagnetic radiation (e.g., electromagnetic radiation within the visual, ultraviolet, infrared, or other wavelengths) and provide an image from the electromagnetic radiation. In various examples, star tracker 104 may output imaging data based on the electromagnetic radiation detected by imaging sensor 112.

In certain examples, baffle 114 is disposed proximate to imaging sensor 112. Baffle 114 is configured to attenuate the electromagnetic radiation received by imaging sensor 112 (e.g., decrease the intensity of electromagnetic radiation received by imaging sensor 112). Thus, baffle 114 includes one or more filters or other components to attenuate (e.g., decrease the magnitude of) electromagnetic radiation received by imaging sensor 112.

In certain examples, baffle 114 includes a plurality of ports. One or more first ports (e.g., sun ports) are configured to receive electromagnetic radiation from the sun and one or more second ports (e.g., star ports) are configured to receive electromagnetic radiation from the stars. The first ports include the one or more filters to attenuate the electromagnetic radiation of the sun. In certain examples, the second ports also include one or more filters, but it is appreciated that the attenuation of the first ports is, in certain examples, greater than the attenuation of the second ports. The first ports and the second ports are configured to image different portions of the sky and, thus, the first ports and the second ports are positioned to be aimed at different portions of the sky. The positioning of the first ports and the second ports allow for stars and the sun to be simultaneously imaged without electromagnetic radiation from the sun substantially affecting the imaging of the stars by the star port.

The baffle 114 includes a beam splitter. The beam splitter is configured to receive the electromagnetic radiation from the first ports and the second ports and combine the various electromagnetic radiation into a combined viewpath. Thus, the beam splitter allows for imaging sensor 112 to simultaneously image data from the first ports and the second ports and, in certain examples, create a composite image.

Star tracker 104 and spacecraft instrument 106 are communicatively coupled to controller 110 via communications network 116. In certain examples, communication network 116 is any type of wired and/or wireless network that communicates data and/or power to and from controller 110. Controller 110 includes, in various examples, a memory, a processor, and other logic device components. Controller 110 is configured to receive data, performs calculations, and provides outputs (e.g., control instructions) to various other systems of spacecraft 100. Thus, for example, controller 110 is configured to receive data from imaging sensor 112 and create an image from the data.

Star Tracker Example

Figure 3A:
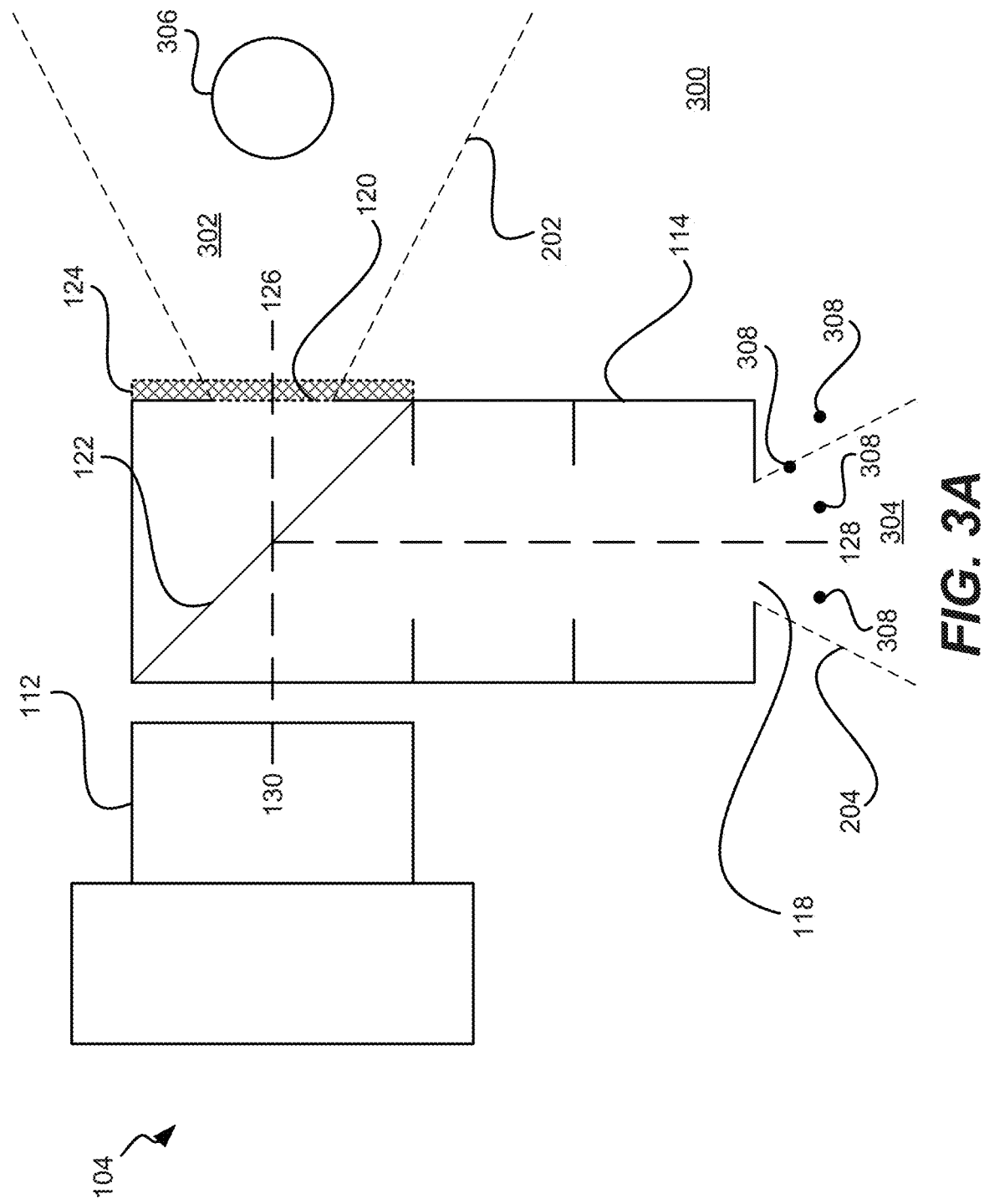
FIG. 3A illustrates a side representation of a direct sun imaging star tracker, in accordance with some examples.

FIG. 3A illustrates a side representation of a direct sun imaging star tracker, in accordance with some examples. FIG. 3A illustrates portions of star tracker 104. Star tracker 104 includes imaging sensor 112 and baffle 114 disposed proximate to imaging sensor 112. Imaging sensor 112 includes one or more sensors configured to sense electromagnetic radiation through one or more bandwidths (e.g., infrared, visual, ultraviolet, and/or other bandwidths). In certain examples, imaging sensor 112 is one sensor, while other examples include a plurality of sensors, such as an array of sensors, for imaging sensor 112.

In various examples, some or all of the electromagnetic radiation that reaches imaging sensor 112 will first pass through baffle 114. Baffle 114 is positioned proximate to imaging sensor 112 (e.g., in front of imaging sensor 112). In various examples, baffle 114 includes beam splitter 122, sun port 120, star port 118, and filter 124. One or more light paths are further included within baffle 114, including first path 128, second path 126, and combined viewpath 130.

In certain examples, star port 118 is configured to view first viewing environment 304 through first view perspective 204. Star port 118 is thus configured to view objects within first view perspective 204. First view perspective 204, in the example of FIG. 3A, allows for star port 118 to view first viewing environment 304. In a certain example, first viewing environment 304 includes stars 308. Electromagnetic radiation generated by stars 308 are a part of first viewing environment 304. In a certain example, the electromagnetic radiation generated by stars 308 enters through star port 118 and reaches beam splitter 122 via first path 128. First path 128 is a pathway within baffle 114.

Sun port 120 is configured to view second viewing environment 302 through second view perspective 202. In a certain example, second viewing environment 302 includes sun 306. Electromagnetic radiation generated by sun 306 is a part of second viewing environment 302 and is imaged through sun port 120. In certain examples, stars are also a part of second viewing environment 302. However, because the intensity of sun 306 is much greater than the intensity of the stars, electromagnetic radiation from sun 306 will wash out the view of the stars within images of second viewing environment 302. As such, in a certain example, when imaging sun 306 within second viewing environment 302, the stars within second viewing environment 302 are unable to be imaged.

Filter 124 attenuates the intensity of electromagnetic radiation from second viewing environment 302 that passes through sun port 120. In certain examples, filter 124 attenuates up to 99%, up to 99.5%, up to 99.9%, or more than 99.9% of the electromagnetic radiation from second viewing environment 302. Filter 124 is, thus, configured to attenuate electromagnetic radiation from second viewing environment 302 to a magnitude that allows for simultaneous imaging of first viewing environment 304 by star port 118 and second viewing environment 302 by sun port 120 without washing out either view. In various examples, filter 124 is any type of filter that will attenuate electromagnetic radiation in any bandwidth. Though FIG. 3A illustrates filter 124 disposed in front of sun port 120, it is appreciated that filter 124, in other examples, is disposed along any portion of second path 126.

Electromagnetic radiation from second viewing environment 302 enters through sun port 120 into baffle 114 and reaches beam splitter 122 via second path 126. As described herein, the electromagnetic radiation passes through filter 124. Filter 124 attenuates a portion of the electromagnetic radiation of second path 126, as described herein. Variously, first path 128 and/or second path 126 include one or a plurality of stages that includes various filters, reflectors, and/or other equipment for attenuating or enhancing the electromagnetic radiation.

While the example of FIG. 3A illustrates baffle 114 with a star port portion that is longer than a sun port portion, other examples include sun port portions that are just as long or longer than the star port portions. In certain examples, the field of views of sun port 120 and star port 118 are different. That is, for example, as sun port 120 is configured to be concentrated on sun 306 while star port 118 is configured to image stars 308, sun port 120 has a field of view that is smaller than the field of view of star port 118. For example, in certain such configurations, the field of view of star port 118 is twice as large, three times as large, or multiple times that of sun port 120.

The electromagnetic radiation of first path 128 and second path 126 are combined by beam splitter 122 into combined viewpath 130. The combined electromagnetic radiation then reaches imaging sensor 112 along combined viewpath 130.

Thus, combined viewpath 130 includes electromagnetic radiation that is a combination of the electromagnetic radiation of first path 128 and second path 126. As imaging sensor 112 receives the combined electromagnetic radiation of combined viewpath 130, the image output by imaging sensor 112 includes both sun 306 and stars 308 within one view. In various examples, proper attenuation of the electromagnetic radiation of sun 306 prevents wash out of stars 308 from the image. As such, the resulting image is useful for navigation through using stars 308 and for viewing of sun 306 as well as any objects in front of sun 306.

In various examples, beam splitter 122 is a flat piece of glass. The glass is, in certain examples, aluminized with a thickness that optimizes the amount of reflectivity or transmission between first path 128 and second path 126. Beam splitter 122 includes, in certain examples, a spectral dichroic filter for filtering light from one or more directions (e.g., beam splitter 122 includes the spectral dichroic filter on the portion where solar light passes through), such that the maximum amount of stellar light is passed through star port 118, while low sensitivity regions of imaging sensor 112 is used for sun port 120. For example, a dichroic beam splitter is configured to pass only a very narrow band of blue light. In such a configuration, the solar image would be able to have higher spatial resolution while imaging sun 306, with no loss of signal for the stellar image. Such a configuration allows for superior imaging and prevents burn out of portions of imaging sensor 112.

As shown, star port 118 and sun port 120 are configured to image different portions of the environment. Thus, first viewing environment 304 and second viewing environment 302 are different portions of the sky. In certain examples, first path 128 and second path 126 are non-parallel to each other and, thus, star port 118 and sun port 120 are disposed at angles to each other.

As such, star tracker 104 as described herein allows for imaging of both sun 306 and stars 308 with one star tracker and without a filter wheel or other mechanism. Such a configuration allows for a star tracker to image the sun with less parts, less weights, and improved reliability.

Figure 3B:
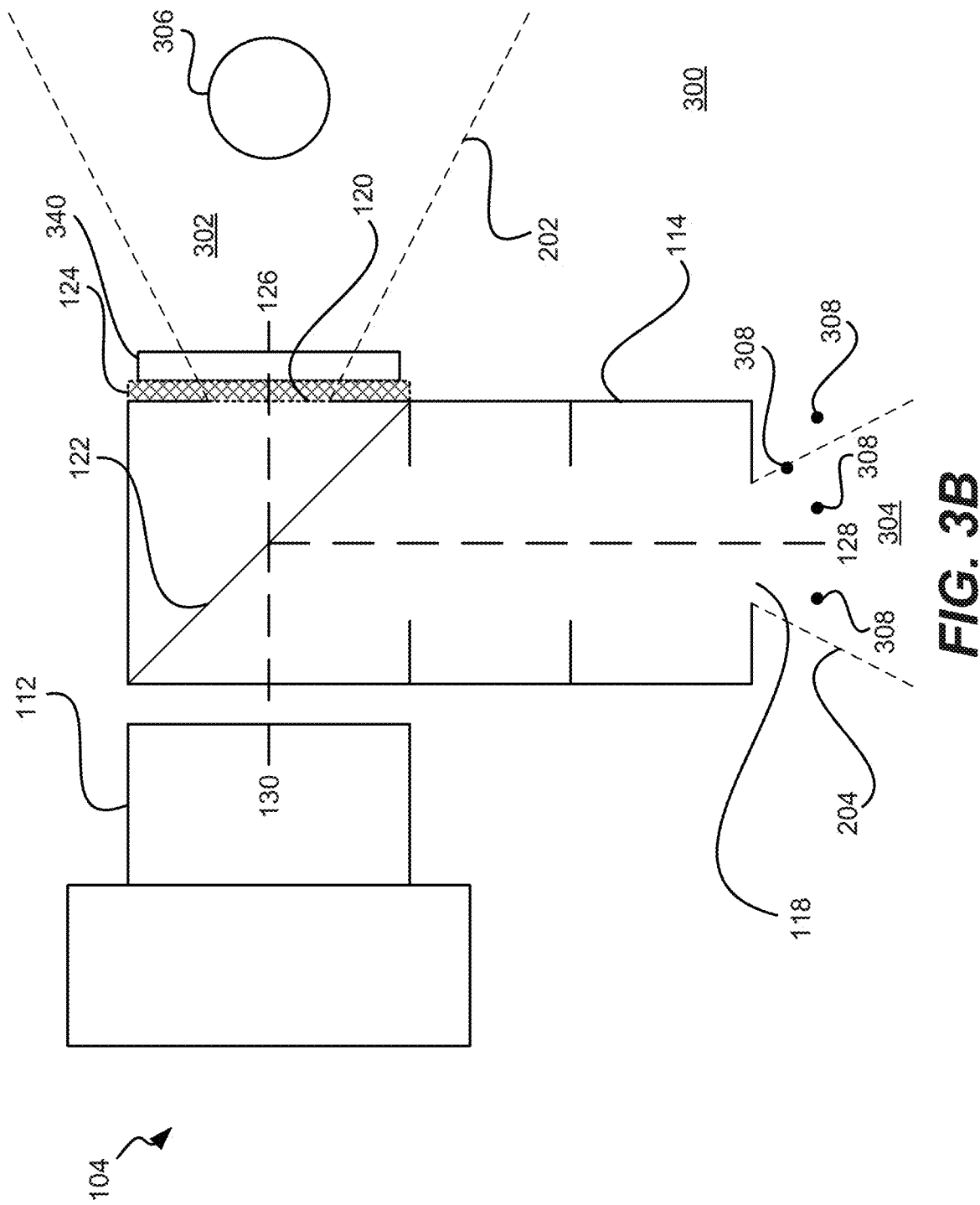
FIG. 3B illustrates a side representation of a further example of the direct sun imaging star tracker of FIG. 3A, in accordance with some examples.

FIG. 3B illustrates a side representation of a further example of the direct sun imaging star tracker of FIG. 3A, in accordance with some examples. FIG. 3B illustrates star tracker 104. In FIG. 3B, star tracker 104 includes lens 340 disposed over filter 124 of sun port 120. In certain examples, lens 340 is an additional lens disposed over filter 124. Though the example shown in FIG. 3B couples lens 340 to filter 124, other examples includes lens 340 disposed a relative distance away from filter 124.

Lens 340, in certain examples, is added to sun port 120 to shorten and/or lengthen the effective focal length of sun port 120. Shortening the effective focal length allows for sun 306 to be detected over a wider field of view (e.g., sun 306 appears smaller on imaging sensor 112 and, thus, in the image, visible over a wider field of view). Lengthening the effective focal length allows for sun 306 to appear larger on imaging sensor 112 (e.g., for better imaging of targets in silhouette against sun 306).

Figure 4A:
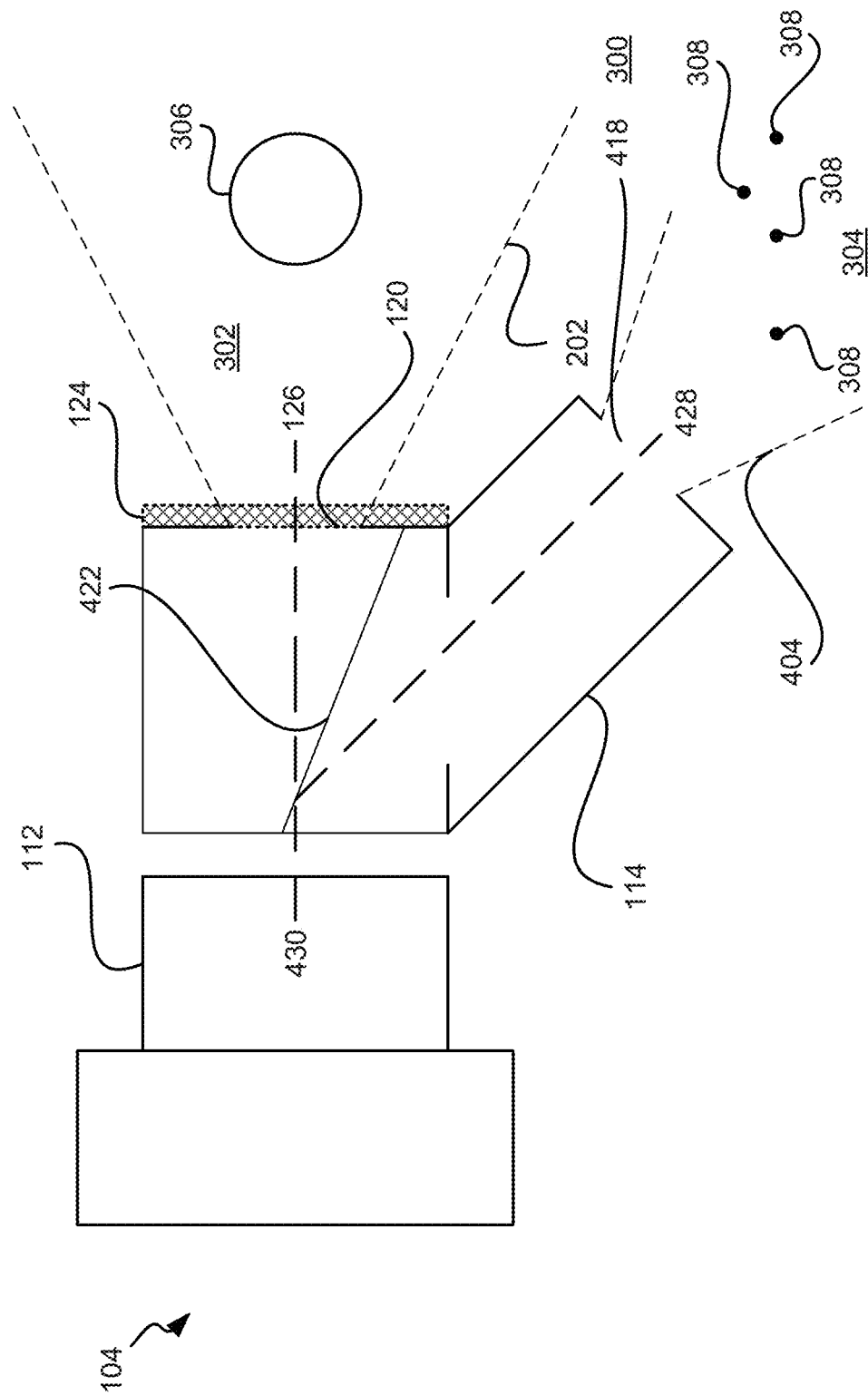
FIG. 4A illustrates a side representation of another direct sun imaging star tracker, in accordance with some examples.

While the examples in FIGS. 3A and 3B illustrate examples wherein the portion of baffle 114 that includes first path 128 and star port 118 is disposed at a 90 degree angle relative to the portion of baffle 114 that includes second path 126 and sun port 120, other examples, such as the example in FIG. 4A, disposes the various paths and ports in different configurations and/or at different angles. FIG. 4A illustrates a side representation of another direct sun imaging star tracker, in accordance with some examples.

In FIG. 4A, the portion of baffle 114 that includes star port 418 and first path 428 is disposed at a non-right angle to the portion of baffle 114 that includes sun port 120 and second path 126. Beam splitter 422 is accordingly rearranged so that the electromagnetic radiation of first path 428 and second path 126 is combined into an appropriate combined viewpath 430 for imaging sensor 112.

Figure 4B:
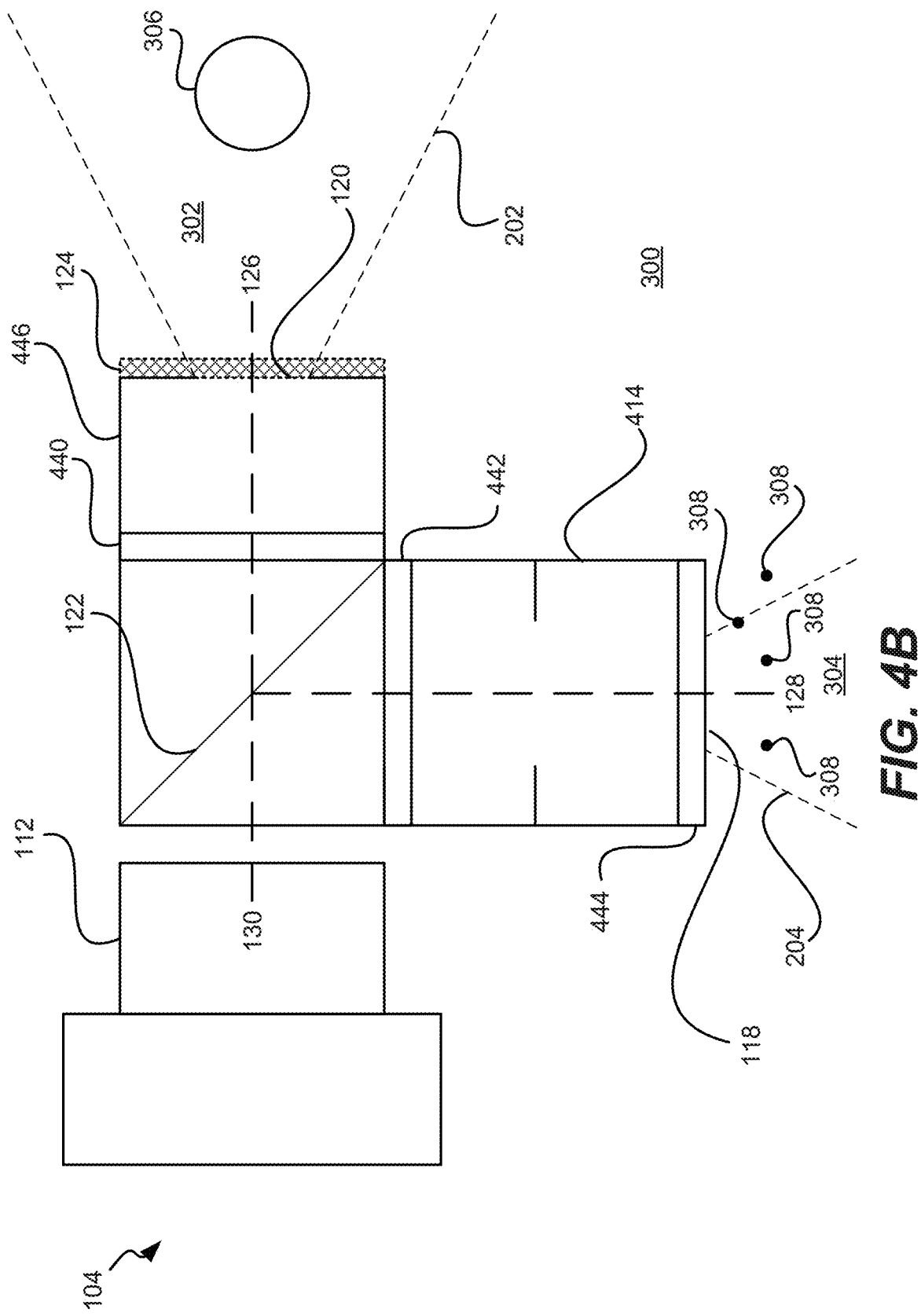
FIG. 4B illustrates a side representation of a further direct sun imaging star tracker, in accordance with some examples.

FIG. 4B illustrates a side representation of a further direct sun imaging star tracker, in accordance with some examples. FIG. 4B illustrates star tracker 104 that includes baffle 414 disposed over imaging sensor 112. Baffle 414 includes lens 440 disposed within second path 126 and lenses 442 and 444 disposed within different portions of first path 128. Thus, separate lenses are used for the different focal paths of first path 128 and second path 126. Lenses 440 and 442 are disposed within baffle 414 (e.g., behind sun port 120 and star port 118, respectively) while lens 444 is disposed at star port 118, similar to lens 340 of FIG. 3B.

Lenses 440 and 442 and 444 allow for the focal length of the respective second path 126 and the first path 128 to be shortened or lengthened. As described herein, a shorter focal length for sun 306 would enable a wider field of view around the sun (e.g., allow for the sun to be observed over a larger field of view) while a longer focal length for sun 306 would allow for greater detail of the view of sun 306 and any objects in silhouette against sun 306. Additionally, a shorter focal length for first path 128 would allow for stars 308 to be positioned accordingly within the view (e.g., in combination with positioning of beam splitter 122). A shorter focal length for first path 128 allows for stars 308 to be seen over a wider field of view.

Example Techniques of Operating a Star Tracker

Figure 5:
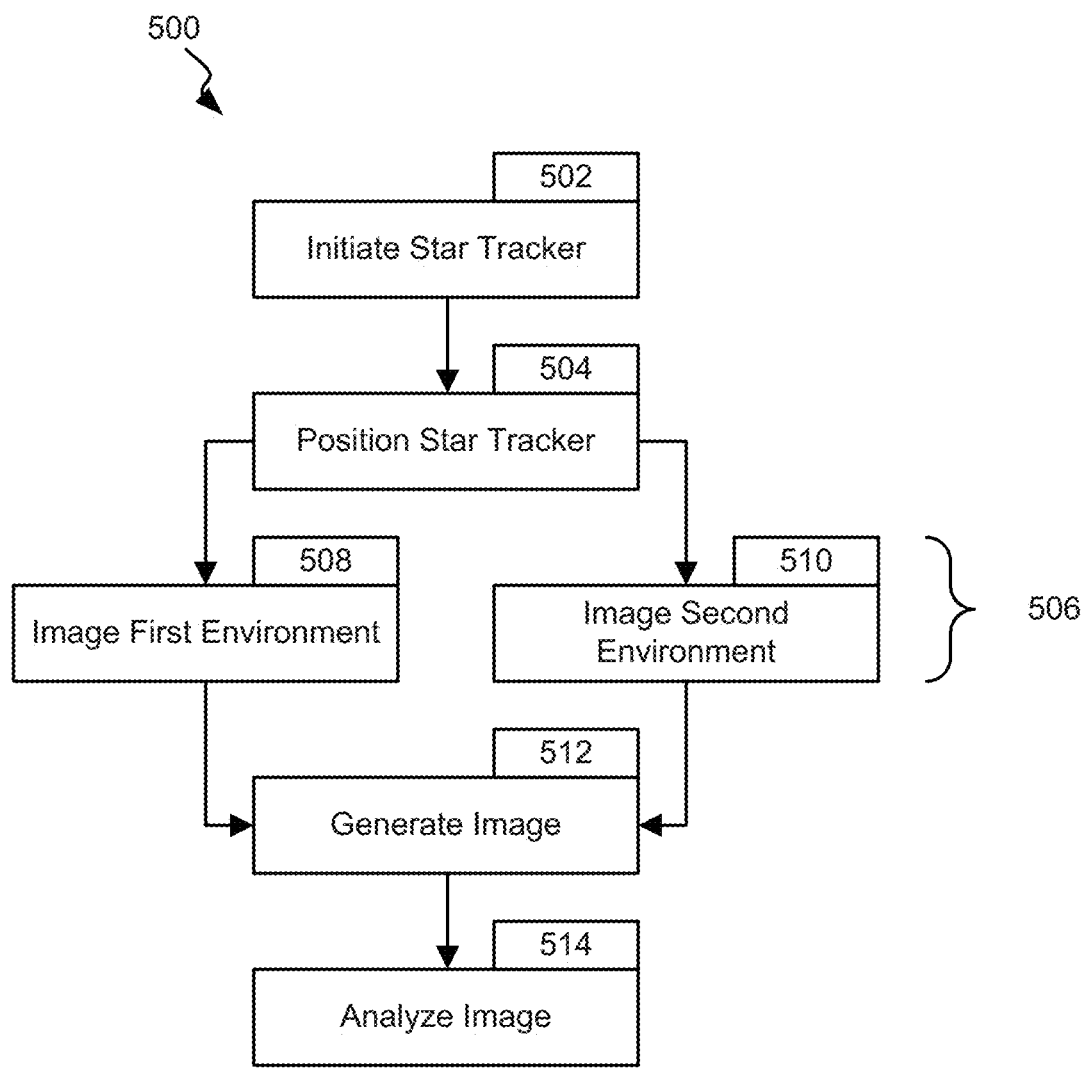
FIG. 5 illustrates a flow chart of example direct sun imaging star tracker operation, in accordance with some examples.

FIG. 5 illustrates a flow chart of example direct sun imaging star tracker operation, in accordance with some examples. FIG. 5 illustrates a technique 500 of operating the star tracker described herein.

In 502, the star tracker is initialized. As such, the star tracker becomes operational and is configured to image various portions of the environment proximate to the star tracker (e.g., the sky around the star tracker). In 504, the star tracker is positioned. Positioning of the star tracker includes, in certain examples, positioning the sun port so that the sun is visible within the image received through the sun port. The star port is accordingly positioned so that the sun is not visible within the image received through the star port. In certain examples, as part of positioning the star tracker, the solar panels (e.g., power systems 108) of the spacecraft are oriented in the same direction as that of the sun port. As the sun port is configured to view the sun and the solar panels are most efficient when oriented towards the sun, orienting both in such a manner allows for efficient operation of the spacecraft. Thus, the plane of the solar panels is positioned to be normal to the rays of the sun in such a configuration.

506 includes techniques for imaging the sun and stars around the environment of the star tracker. Thus, the first viewing environment is imaged in 508 and the second viewing environment is imaged in 510. Imaging of the first viewing environment and the second viewing environment is, in certain examples, performed around the same time or during overlapping time periods. The first viewing environment, in certain examples, includes a sun. Thus, a baffle of the star tracker appropriately attenuates the electromagnetic radiation of the sun of the first viewing environment so that, in the combined image generated from imaging the first viewing environment and the second viewing environment, both the sun and the stars are visible.

Based on the imaging in 506, a combined image is generated in 512 (e.g., from the electromagnetic radiation of the combined viewpath). The image is a representation of both the first viewing environment and the second viewing environment and, thus, includes both the sun as well as any stars within the first viewing environment. In certain examples, washout from the intensity of the electromagnetic radiation generated by the sun within the second viewing environment results in the image not including any stars that are present within the second viewing environment.

The image is analyzed in 514. In certain examples, analysis of the image is performed by one or more controllers as described herein. Analysis of the image includes one or more of, for example, analyzing the image of the sun (e.g., to confirm that the sun is depicted within the image via confirmation of its angular diameter and/or to determine sun spots or any other features of the sun), analyzing the image of the sun to determine the presence of objects in front of the sun, analyzing the stars within the image for navigational purposes (e.g., to determine the actual position of the spacecraft by determining the position of the stars), and/or other such analysis.

In certain examples, though the image is generated from the electromagnetic radiation of both the first viewing environment and the second viewing environment, the image is a single image that combines (e.g., overlays) the first viewing environment and the second viewing environment. Thus, though the first viewing environment and the second viewing environment are different portions of the environment, the image combines both into a single environment. As such, the stars in the image are shown to be proximate to the sun even though they are actually in two different positions. Thus, in various examples, a controller analyzing the image determines that, due to washout from the intensity of the electromagnetic radiation generated by the sun within the second viewing environment, any stars within the image are located within the first viewing environment. The controller is then able to navigate using the stars while observing the sun, all from the same image.

Figure 6A:
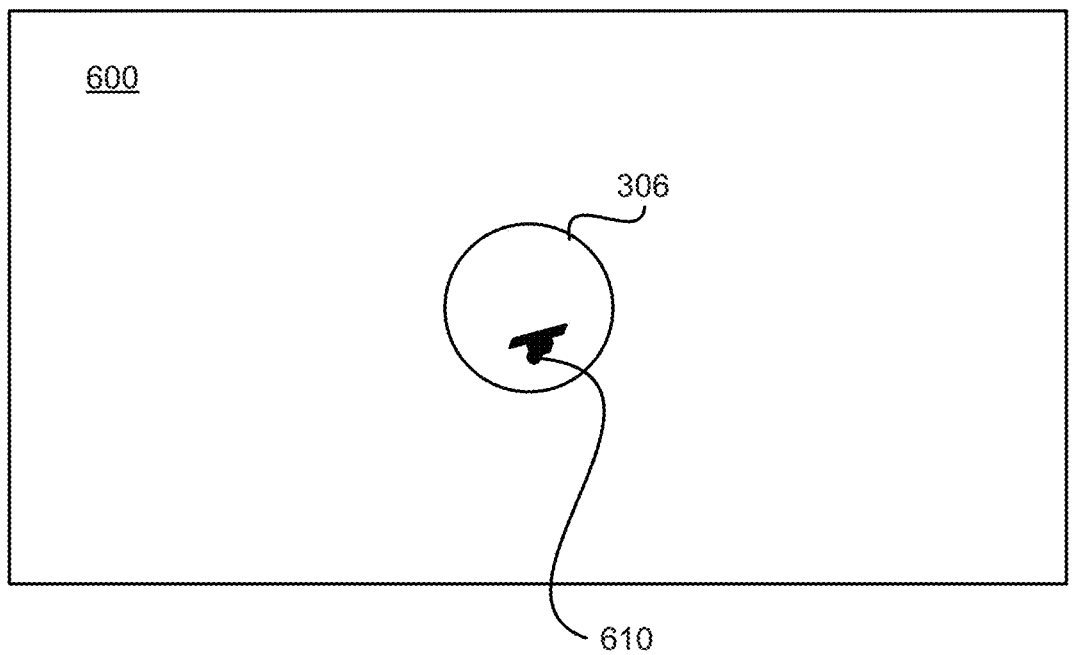
FIGS. 6A-D illustrate example images obtained by a direct sun imaging star tracker, in accordance with some examples.

Examples of such images are described herein. FIGS. 6A-D illustrate example images obtained by a direct sun imaging star tracker, in accordance with some examples. FIG. 6A illustrates an example of image 600 created from electromagnetic radiation through a sun port of the baffle described herein. Image 600 represents the image created from the electromagnetic radiation of a second path as described herein. Image 600 includes sun 306 and satellite 610 disposed in front of sun 306. Image 600 has been sufficiently attenuated so that satellite 610 is viewable in front of sun 306. In certain examples, satellite 610 is, alternatively or additionally, space debris, or another object of interest.

Figure 6B:
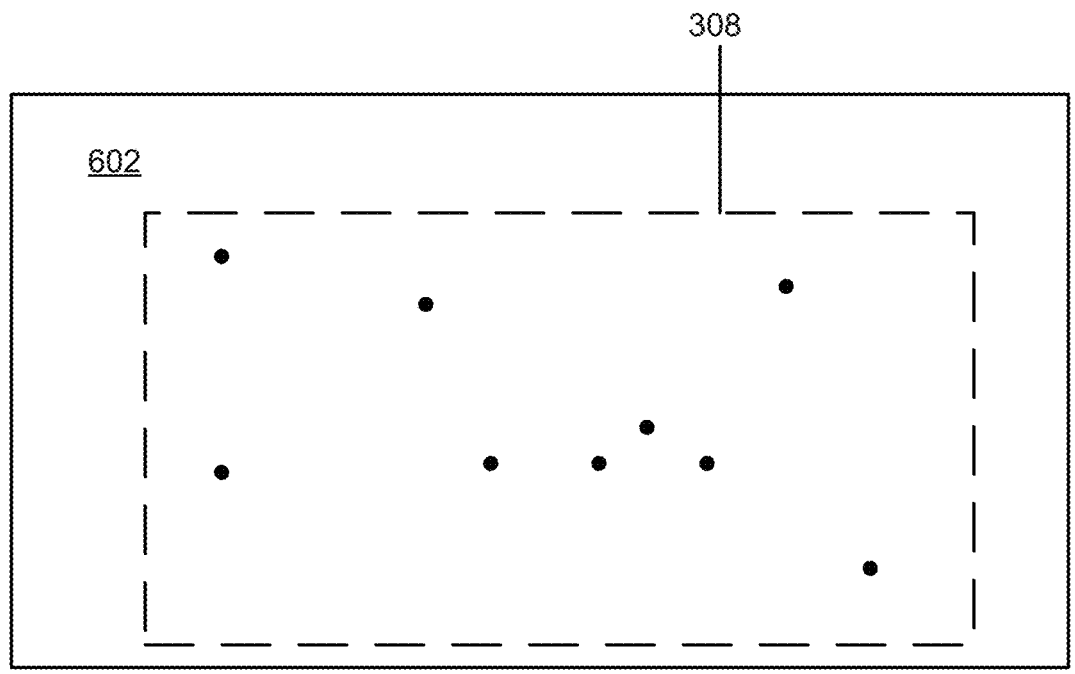

FIG. 6B illustrates an example of image 602 created from electromagnetic radiation through a star part of the baffle described herein. Image 602 represents the image created from the electromagnetic radiation of a first path as described herein. Image 602 includes stars 308 within the viewing environment of the star port.

Figure 6C:
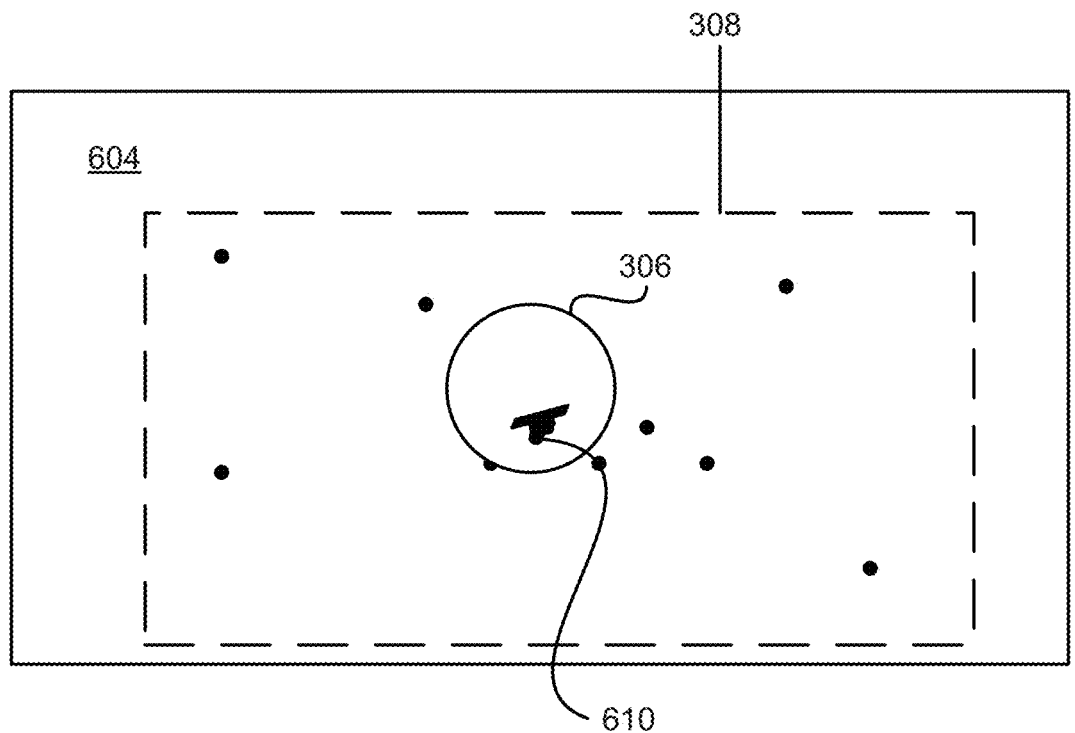

FIG. 6C illustrates an example of image 604 that combines the electromagnetic radiation received through the sun port and the star port of the baffle described herein. Thus, image 604 represents the image created from the electromagnetic radiation of a combined viewpath after a beam splitter. As such, image 604 includes both sun 306, satellite 610 in front of sun 306, and stars 308.

As shown in image 604, stars 308 look to be within the same viewing environment as sun 306 and satellite 610 and sun 306 overlaps with some stars 308. However, in certain examples, as the sun port and star port image different portions of the environment, the position of stars 308 in actuality do not overlap with the position of sun 306. The overlapping is due to the beam splitter combining the electromagnetic radiation of the different portions that are imaged by the sun port and the star port. In certain examples, analysis of image 604 is performed by identifying all stars 308 contained within image 604 as being imaged from the viewing environment of the star port.

Figure 6D:
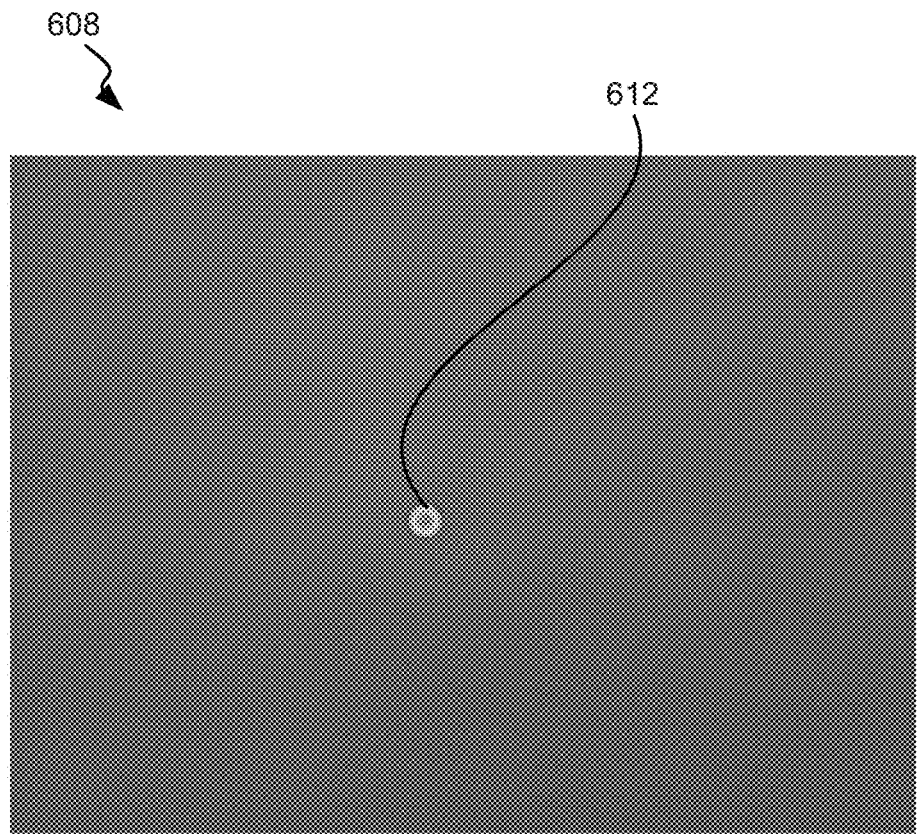

FIG. 6D illustrates image 608 that includes a neutral density image of sun 612. Image 608 illustrates an alternative image of sun 612. Such an alternative image is used in certain examples in the imaging of portions of the viewing environment.

Vehicle Examples

While the systems, apparatus, and methods disclosed above have been described with reference to spacecraft and the aerospace industry, it will be appreciated that the examples disclosed herein is applicable to other contexts as well, such as observatory, automotive, ship, aircraft, and other mechanical and vehicular contexts. For example, the systems and apparatus described herein is, in certain other examples, mounted on a gimbal of an aircraft. Accordingly, examples of the disclosure is described in the context of a spacecraft manufacturing and service method 700 as shown in FIG. 7A and vehicle 750 as shown in FIG. 7B as applicable to such other contexts.

Figure 7A:
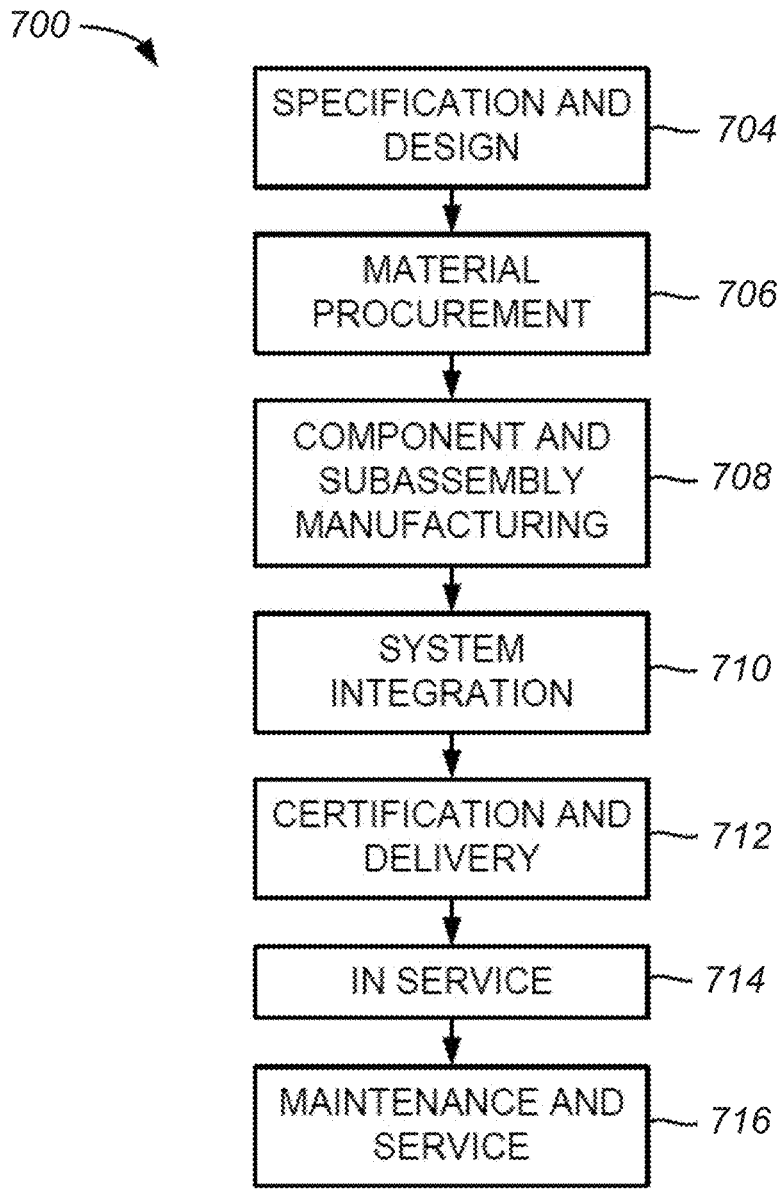
FIGS. 7A and 7B are flowcharts illustrating techniques for operating a direct sun imaging star tracker system, in accordance with some examples.

FIG. 7A illustrates a flow chart of an example of a vehicle production and service methodology, in accordance with some examples. In some examples, during pre-production, method 700 includes the specification and design 704 of vehicle 750 (e.g., a spacecraft as shown in FIG. 1) and material procurement 706. During production, component and subassembly manufacturing 708 and system integration 710 of vehicle 750 takes place. Thereafter, vehicle 750 goes through certification and delivery 712 in order to be placed in service 714. While in service, in certain examples, vehicle 750 is scheduled for maintenance and service 716 (e.g., modification, reconfiguration, refurbishment, and so on).

In certain examples, each of the processes of method 700 is performed or carried out by a system integrator, a third party, and/or an operator (e.g., a customer). For the purposes of this description, a system integrator includes any number of aerospace manufacturers and major-system subcontractors; a third party includes any number of venders, subcontractors, and suppliers; and an operator includes, in certain examples, an airline, leasing company, military entity, service organization, and so on.

Figure 7B:
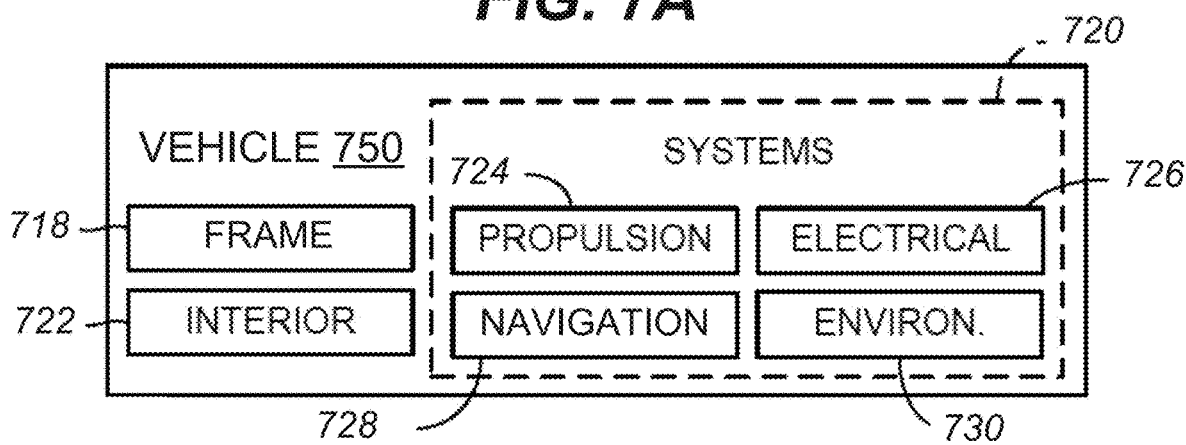

FIG. 7B illustrates a block diagram of an example of a vehicle, in accordance with some examples. As shown in FIG. 7B, the vehicle 750 (e.g., a spacecraft) produced by method 700 includes frame 718 with plurality of systems 720, and interior 722. Examples of systems 720 include one or more of propulsion system 724, electrical system 726, navigation system 728, and environmental system 730. In various examples, other systems are also included within vehicle 750. Although an aerospace example is shown, the described principles are applicable to other industries, such as the automotive industry.

Additional Examples

Figure 8A:
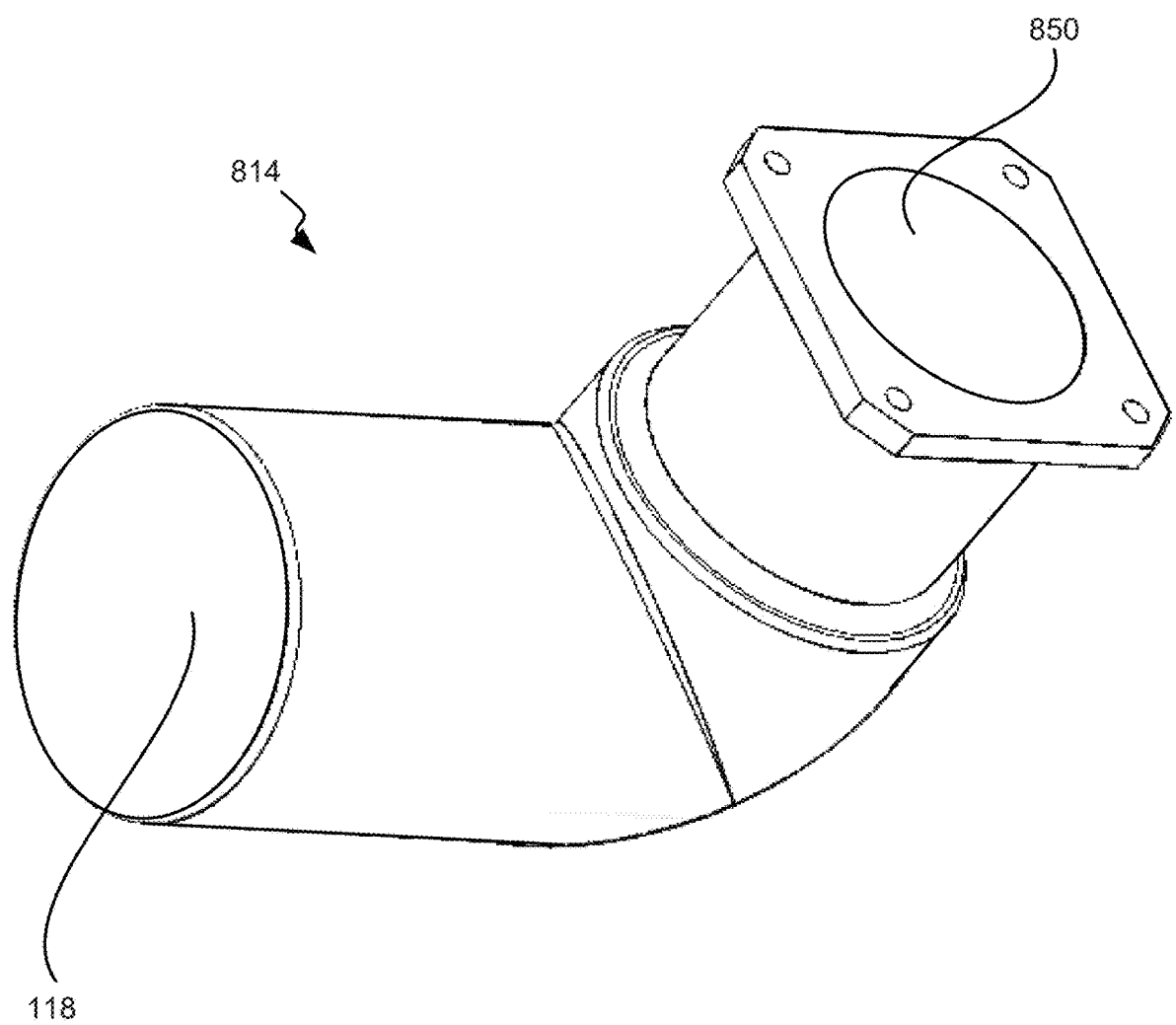
FIGS. 8A and 8B are representations of a baffle of a direct sun imaging star tracker, in accordance with some examples.
Figure 8B:
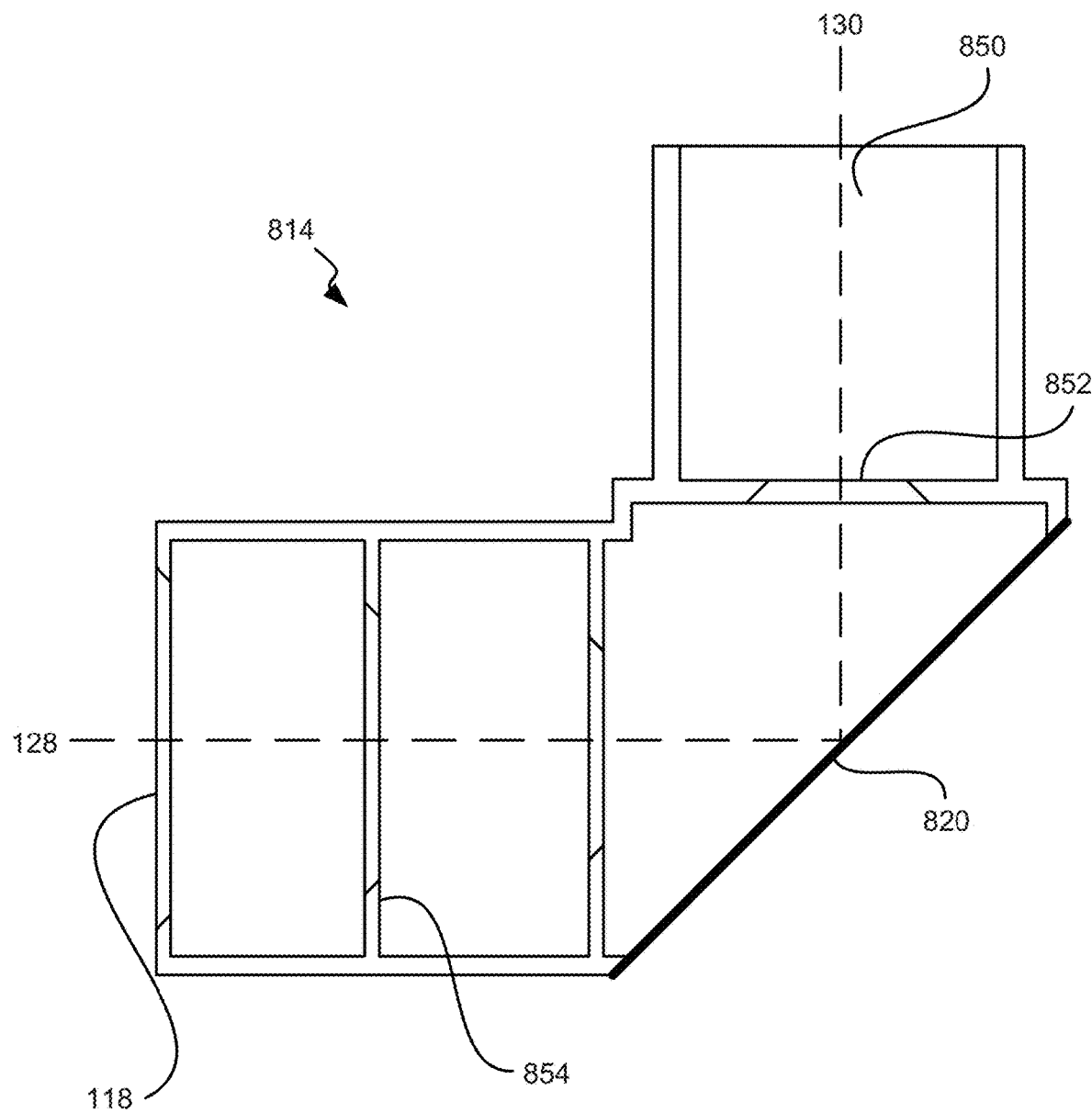

FIGS. 8A and 8B are representations of a baffle of a direct sun imaging star tracker, in accordance with some examples.

FIG. 8A illustrates baffle 814 that includes star port 118 and imaging sensor receiver 850. Imaging sensor receiver 850 is configured to receive imaging sensor 112. FIG. 8B illustrates a side representation of baffle 814. As shown in FIG. 8B, baffle 814 includes star port 118 and imaging sensor receiver 850. Sensor port 852 is disposed on an end of imaging sensor receiver 850.

Furthermore, baffle 814 includes one or more internal baffles 854 disposed within its view paths. In various examples, internal baffles are included within first path 128, second path 126, and/or combined viewpath 130 to, for example, accommodate requirements on solar, lunar, and/or Earth pointing exclusion zones. As such, internal baffles 854 allow for limiting of the viewpoint of its associated port.

Baffle 814 further includes sun port 820. Sun port 820 includes one or more lenses and, in certain example, one or more filters to attenuate the magnitude of sunlight. In certain examples, sun port 820 is disposed at an angle to first path 128. In certain examples, sun port 820 is disposed at, for example, between a 30-60 degree angle, such as a 45 degree angle as shown in FIG. 8B, to first path 128. In certain such configurations, sun port 820 attenuates the magnitude of sunlight through one or more filters, acts as a beam splitter due to its orientation, and, in certain examples, changes the focal length of sun port 820. Thus, for example, a lens disposed within sun port 820 acts as the beam splitter. Sun port 820 thus combines first path 128 and a view of the sun into combined viewpath 130. In additional examples, sensor port 852 and/or sun port 820 includes a star reflective mirror or another such lens. Thus, for example, sensor port 852 in certain examples includes a lens. The lens, in certain examples, aids in focusing of images for imaging sensor 112.

Figure 9A:
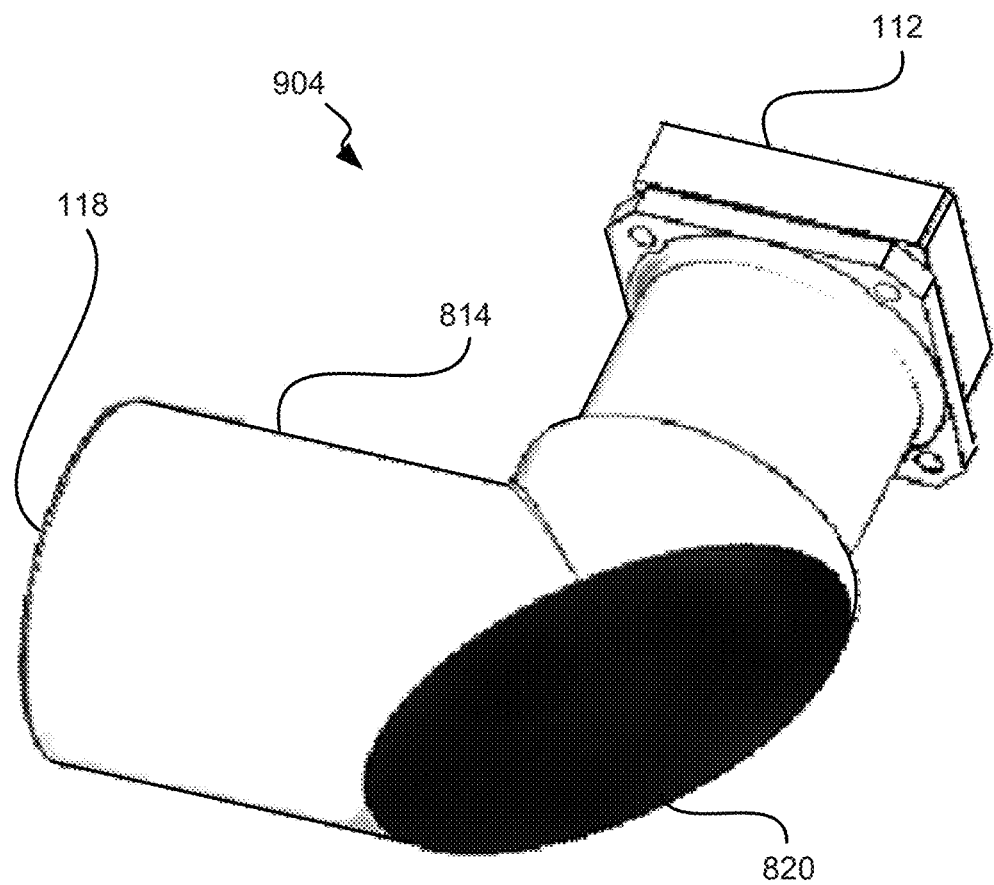
FIGS. 9A and 9B are representations of a direct sun imaging star tracker, in accordance with some examples.
Figure 9B:
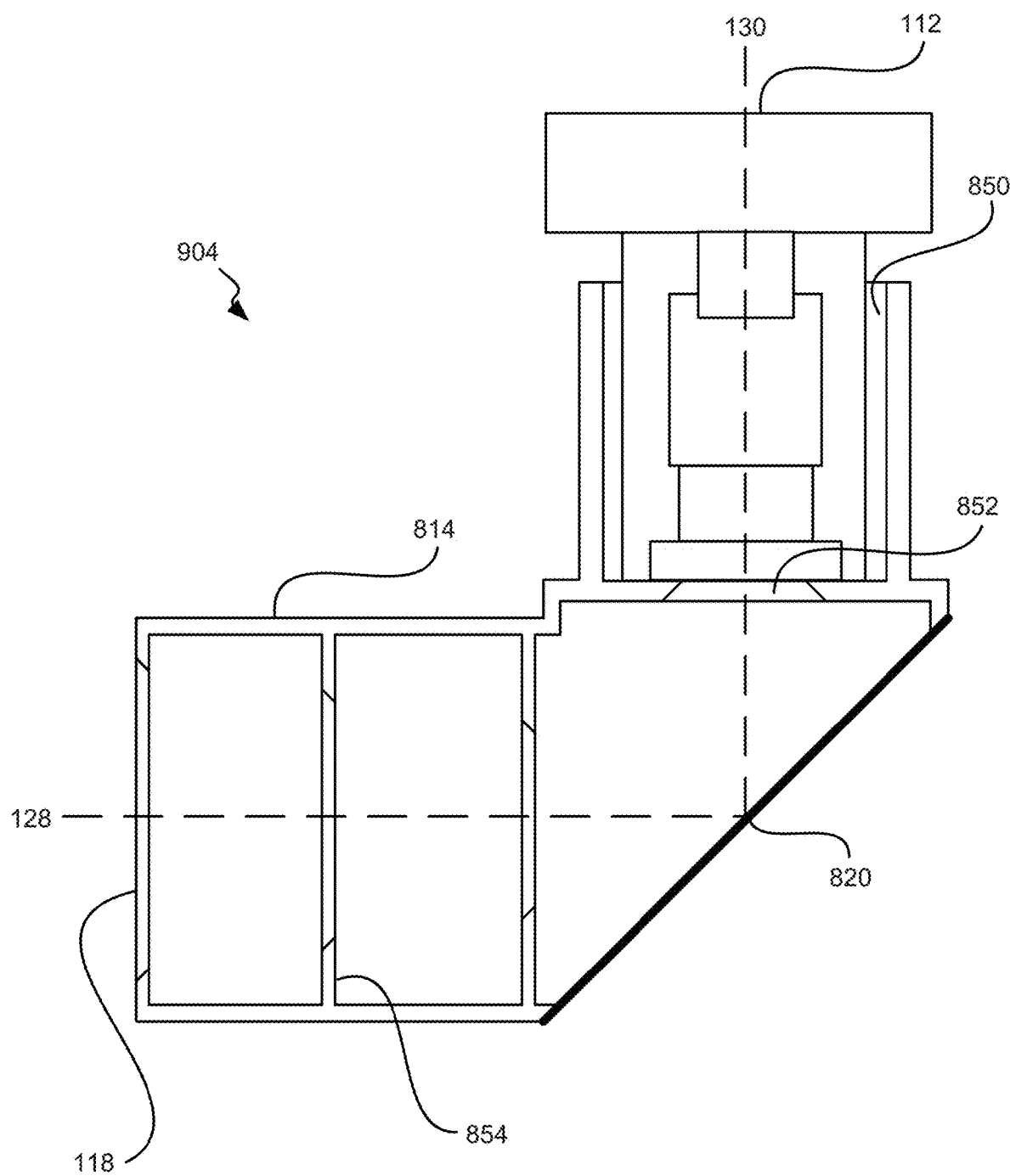

FIGS. 9A and 9B are representations of a direct sun imaging star tracker, in accordance with some examples. As shown in FIGS. 9A and 9B, star tracker 904 includes baffle 814 and imaging sensor 112 disposed within imaging sensor receiver 850. Baffle 814 includes star port 118 and sun port 820. As shown in FIG. 9B, combined viewpath 130 is directed into one or more sensors of imaging sensor 112.

Further Examples

Further, the disclosure includes examples according to the following clauses:

Clause 1. A spacecraft 100, comprising:
a spacecraft structure 102; and
a star tracker 104, coupled to the spacecraft structure 102 and comprising:
an imaging sensor 112, configured to receive electromagnetic radiation via a combined viewpath 130; and
a baffle 114, disposed proximate the imaging sensor 112 and comprising:
a star port 118, configured to receive first electromagnetic radiation associated with a first viewing environment 304 via a first path 128;
a sun port 120, configured to receive second electromagnetic radiation associated with a second viewing environment 302 via a second path 126 and configured to attenuate a magnitude of the second electromagnetic radiation; and
a beam splitter 122, configured to receive the first electromagnetic radiation of the first path 128 and the second electromagnetic radiation of the second path 126 and configured to combine the first electromagnetic radiation and the second electromagnetic radiation into the combined viewpath 130.

Clause 2. The spacecraft 100 of clause 1, wherein the sun port 120 is configured to attenuate 99% or more of the magnitude of the second electromagnetic radiation received.

Clause 3. The spacecraft 100 of clause 1, wherein the first path 128 is non-parallel to the second path 126.

Clause 4. The spacecraft 100 of clause 1, further comprising a controller 110, configured to:
receive 506 imaging data from the imaging sensor 112; and
output 512 an image 604 based on the imaging data, wherein the image 604 is associated with both the first viewing environment 304 and the second viewing environment 302.

Clause 5. The spacecraft 100 of clause 4, wherein the first viewing environment 304 is a first portion of a sky 300, wherein the second viewing environment 302 is a second portion of the sky 300, and wherein the image 604 combines both the first viewing environment 304 and the second viewing environment 302.

Clause 6. The spacecraft 100 of clause 1, wherein the sun port 120 is configured to attenuate the second electromagnetic radiation to a first level to allow for simultaneous imaging of one or more stars 308 with the star port 118 and a sun 306 with the sun port 120.

Clause 7. The spacecraft 100 of clause 6, wherein the spacecraft 100 is configured to simultaneously image the one or more stars 308 and the sun 306 while in orbit around Earth.

Clause 8. The spacecraft 100 of clause 1, wherein the imaging sensor 112 is a visual sensor.

Clause 9. A star tracker 104, comprising:
an imaging sensor 112, configured to receive electromagnetic radiation via a combined viewpath 130; and
a baffle 114, disposed proximate the imaging sensor 112 and comprising:
a star port 118, configured to receive first electromagnetic radiation associated with a first viewing environment 304 via a first path 128;
a sun port 120, configured to receive second electromagnetic radiation associated with a second viewing environment 302 via a second path 126 and configured to attenuate a magnitude of the second electromagnetic radiation; and
a beam splitter 122, configured to receive the first electromagnetic radiation of the first path 128 and the second electromagnetic radiation of the second path 126 and configured to combine the first electromagnetic radiation and the second electromagnetic radiation into the combined viewpath 130.

Clause 10. The star tracker 104 of clause 9, wherein the sun port 120 is configured to attenuate 99% or more of the magnitude of the second electromagnetic radiation received.

Clause 11. The star tracker 104 of clause 9, wherein the first path 128 is non-parallel to the second path 126.

Clause 12. The star tracker 104 of clause 9, further comprising a controller 110, configured to:
receive 506 imaging data from the imaging sensor 112; and
output 512 an image 604 based on the imaging data, wherein the image 604 is associated with both the first viewing environment 304 and the second viewing environment 302.

Clause 13. The star tracker 104 of clause 12, wherein the first viewing environment 304 is a first portion of a sky 300, wherein the second viewing environment 302 is a second portion of the sky 300, and wherein the image 604 combines both the first viewing environment 304 and the second viewing environment 302.

Clause 14. The star tracker 104 of clause 9, wherein the sun port 120 is configured to attenuate the second electromagnetic radiation to a first level to allow for simultaneous imaging of one or more stars 308 with the star port 118 and a sun 306 with the sun port 120.

Clause 15. The star tracker 104 of clause 9, wherein the imaging sensor 112 is a visual sensor.

Clause 16. The star tracker 104 of clause 9, wherein the beam splitter 122 is disposed within the sun port 120.

Clause 17. The star tracker 104 of clause 9, wherein the sun port 120 is disposed at between a 30-60 degree angle to the first path 128.

Clause 18. The star tracker 104 of clause 9, further comprising a first lens 442 disposed within the first path 128.

Clause 19. The star tracker 104 of clause 9, further comprising a second lens 440 disposed within the second path 126.

Clause 20. The star tracker 104 of clause 9, wherein the beam splitter 122 comprises a spectral dichroic filter.

Clause 21. A method comprising:
positioning 504 a star tracker 104 such that a second viewing environment 302 containing a sun 306 is within view of a sun port 120 of the star tracker 104 and a first viewing environment 304 different from the second viewing environment 302 is within view of a star port 118 of the star tracker 104, wherein the sun port 120 is configured to attenuate a magnitude of the view of the second viewing environment 302; and
imaging 506 the first viewing environment 304 and the second viewing environment 302 with an imaging sensor 112 of the star tracker 104.

Clause 22. The method of clause 21, wherein the star port 118 is configured to receive first electromagnetic radiation associated with the first viewing environment 304 via a first path 128, and wherein the sun port 120 is configured to receive second electromagnetic radiation associated with the second viewing environment 302 via a second path 126.

Clause 23. The method of clause 22, wherein the sun port 120 and the star port 118 are disposed within a baffle 114, and wherein the baffle 114 further comprises a beam splitter 122, configured to receive the first electromagnetic radiation and the second electromagnetic radiation and configured to combine the first electromagnetic radiation and the second electromagnetic radiation into a combined viewpath 130.

Clause 24. The method of clause 22, wherein the sun port 120 is configured to attenuate a magnitude of the second electromagnetic radiation to a first level to allow for simultaneous imaging of one or more stars 308 with the star port 118 and the sun 306 with the sun port 120.

Clause 25. The method of clause 21, further comprising:
generating 512 an image 604 associated with the first viewing environment 304 and the second viewing environment 302; and
determining 514 navigation data for a spacecraft 100 based on the image 604.

Clause 26. The method of clause 21, wherein the positioning 504 the star tracker 104 further comprises orienting a solar panel 108 of a spacecraft 100 in a same direction as that of the sun port 120.

Conclusion

Although foregoing concepts have been described in some detail for purposes of clarity of understanding, it will be apparent that certain changes and modifications may be practiced within scope of appended claims. It should be noted that there are many alternative ways of implementing processes, systems, and apparatuses. Accordingly, present examples are to be considered as illustrative and not restrictive.

The invention claimed is:

1. A spacecraft, comprising:
a spacecraft structure; and
a star tracker, coupled to the spacecraft structure and comprising:
an imaging sensor, configured to receive electromagnetic radiation via a combined viewpath; and
a baffle, disposed proximate the imaging sensor and comprising:
a star port, configured to receive first electromagnetic radiation associated with a first viewing environment via a first path;
a sun port, disposed at between a 30-60 degree angle to the first path, configured to receive second electromagnetic radiation associated with a second viewing environment via a second path and configured to attenuate a magnitude of the second electromagnetic radiation; and
a lens disposed within the sun port configured to act as a beam splitter, configured to receive the first electromagnetic radiation of the first path and the second electromagnetic radiation of the second path and configured to combine the first electromagnetic radiation and the second electromagnetic radiation into the combined viewpath.

2. The spacecraft of claim 1, wherein the sun port is configured to attenuate 99% to 99.5% of the magnitude of the second electromagnetic radiation received, and wherein the baffle further comprises an imaging sensor receiver configured to receive the imaging sensor, and wherein an imaging port is disposed on an end of the imaging sensor receiver.

3. The spacecraft of claim 1, wherein the baffle further comprises one or more internal baffles included within the first path, the second path, and/or the combined viewpath.

4. The spacecraft of claim 1, further comprising a controller, configured to:
receive imaging data from the imaging sensor; and
output an image based on the imaging data, wherein the image is associated with both the first viewing environment and the second viewing environment, wherein the first viewing environment is a first portion of a sky, wherein the second viewing environment is a second portion of the sky, and wherein the image combines both the first viewing environment and the second viewing environment.

5. The spacecraft of claim 1, wherein the first path for the star port and/or the second path for the sun port includes one or more lens for adjusting a focal length of such first and/or second path.

6. A star tracker, comprising:
an imaging sensor, configured to receive electromagnetic radiation via a combined viewpath; and
a baffle, disposed proximate the imaging sensor and comprising:
a star port, configured to receive first electromagnetic radiation associated with a first viewing environment via a first path;
a sun port, disposed at between a 30-60 degree angle to the first path, configured to receive second electromagnetic radiation associated with a second viewing environment via a second path and configured to attenuate a magnitude of the second electromagnetic radiation; and
a lens disposed within the sun port configured to act as a beam splitter, configured to receive the first electromagnetic radiation of the first path and the second electromagnetic radiation of the second path and configured to combine the first electromagnetic radiation and the second electromagnetic radiation into the combined viewpath.

7. The star tracker of claim 6, wherein the star port has a first field of view (FOV) and the sun port has a second FOV that differs from the first FOV.

8. The star tracker of claim 6, wherein the first path is non-parallel to the second path.

9. The star tracker of claim 6, further comprising a controller, configured to:
receive imaging data from the imaging sensor; and
output an image based on the imaging data, wherein the image is associated with both the first viewing environment and the second viewing environment.

10. The star tracker of claim 9, wherein the first viewing environment is a first portion of a sky, wherein the second viewing environment is a second portion of the sky, and wherein the image combines both the first viewing environment and the second viewing environment.

11. The star tracker of claim 6, wherein the sun port is configured to attenuate the second electromagnetic radiation to 99% to 99.9% of its magnitude so as to allow for simultaneous imaging of one or more stars with the star port and a sun with the sun port.

12. The star tracker of claim 6, wherein the imaging sensor is a visual sensor.

13. The star tracker of claim 6, wherein the beam splitter is disposed within the sun port.

14. The star tracker of claim 6, wherein the second path of the second electromagnetic radiation received at the sun port is disposed at between a 30-60 degree angle to the first path.

15. The star tracker of claim 6, wherein the beam splitter comprises a spectral dichroic filter configured for a maximum amount of radiation to pass through the star port while low sensitivity regions of the imaging sensor are used for the sun port.

16. A method comprising:
positioning a star tracker such that a second viewing environment containing a sun is within view of a sun port of the star tracker and a first viewing environment different from the second viewing environment is within view of a star port of the star tracker, wherein the sun port is configured to attenuate a magnitude of the view of the second viewing environment; and
imaging the first viewing environment and the second viewing environment with an imaging sensor of the star tracker,
wherein the star port is configured to receive first electromagnetic radiation associated with the first viewing environment via a first path, and
wherein the sun port is disposed at between a 30-60 degree angle to the first path, and is configured to receive second electromagnetic radiation associated with the second viewing environment via a second path.

17. The method of claim 16, wherein the sun port and the star port are disposed within a baffle, wherein the baffle further comprises a lens disposed within the sun port configured to act as a beam splitter, configured to receive the first electromagnetic radiation and the second electromagnetic radiation and configured to combine the first electromagnetic radiation and the second electromagnetic radiation into a combined viewpath, and wherein the sun port is configured to attenuate a magnitude of the second electromagnetic radiation to a first level to allow for simultaneous imaging of one or more stars with the star port and the sun with the sun port.

18. The method of claim 17, wherein the baffle further comprises one or more internal baffles included within the first path, the second path, and/or the combined viewpath.

19. The method of claim 17, wherein the baffle further comprises an imaging sensor receiver configured to receive the imaging sensor, and wherein an imaging port is disposed on an end of the imaging sensor receiver.

20. The method of claim 16, wherein the positioning the star tracker further comprises orienting a solar panel of a spacecraft in a same direction as that of the sun port, and wherein the method further comprises:
    generating an image associated with the first viewing environment and the second viewing environment; and
    determining navigation data for a spacecraft based on the image.

* * * * *